United States Patent

[11] 3,595,102

| [72] | Inventors | Minoru Ohya;<br>Sumio Uozumi, both of Toyota-shi, Japan |
|---|---|---|
| [21] | Appl. No. | 6,174 |
| [22] | Filed | Jan. 27, 1970 |
| [45] | Patented | July 27, 1971 |
| [73] | Assignee | Toyota Jidosha Kogyo Kabushiki Kaisha<br>Toyota-shi, Japan |
| [32] | Priority | May 9, 1969 |
| [33] | | Japan |
| [31] | | 44/35560 |

[54] HYDRAULIC CONTROL SYSTEM OF AUTOMATIC TRANSMISSIONS
7 Claims, 5 Drawing Figs.

[52] U.S. Cl. ....................................................... 74/645,
74/731, 74/868
[51] Int. Cl. ......................................................F16h 47/00,
B60k 21/10
[50] Field of Search............................................ 74/645;
415/BL

[56] References Cited
UNITED STATES PATENTS
2,579,049 12/1951 Price ............................ 60/39.35

| 2,597,510 | 5/1952 | McBride...................... | 415/BL UX |
| 2,653,446 | 9/1953 | Price ........................... | 60/238 |
| 2,929,267 | 3/1960 | Wilson ........................ | 74/645 |
| 2,995,955 | 8/1961 | Kelley .......................... | 74/645 X |
| 2,999,400 | 9/1961 | Kelley .......................... | 74/645 |
| 3,033,058 | 5/1962 | Kelley .......................... | 74/645 |

*Primary Examiner*—Arthur T. McKeon
*Attorney*—McGlew and Toren

ABSTRACT: An automatic transmission, for motor vehicles and the like, includes a torque converter having at least one stator wheel, a speed change gear connecting the converter to an output shaft, and hydraulic servos controlling components of the speed change gear. A hydraulic control system for the automatic gear shift includes respective hydraulic pressure sensing openings in the suction and pressure sides of at least one stator vane, and a pressure regulating valve regulating a line pressure applied to the servos. A control valve is subjected to the pressures on the suction and pressure sides of the stator vane, and controls the pressure regulating valve to regulate the line pressure, applied to the servos, in accordance with variations in the hydraulic pressures on the suction and pressure sides of the stator vane.

HYDRAULIC CONTROL SYSTEM OF AUTOMATIC TRANSMISSIONS

BACKGROUND OF THE INVENTION

In an automotive vehicle having an automatic transmission including a torque converter, speed change gear driven by the torque converter, hydraulic servos controlling components of the speed change gear and a hydraulic pump driven by the converter, the ratio of the input and the output speeds of the torque converter will change in accordance with torque demands on the driving engine. In turn, this causes a change in the pressure at the output side of the hydraulic pump which results in a variation in the line pressure applied to the hydraulic servos through a pressure regulating valve. The line pressure may be decreased to a value at which it is certain that the hydraulic servos will remain properly actuated.

SUMMARY OF THE INVENTION

This invention relates to hydraulic control systems for automatic transmissions and, more particularly, to a novel and improved hydraulic control system wherein the action of a pressure regulating valve which regulates the line pressure applied to hydraulic servos is modulated in accordance with the respective hydraulic pressures on the suction and pressure sides of a stator vane of a torque converter.

In accordance with the invention, a hydraulic control system for an automatic transmission having a torque converter and a speed change gear unit with hydraulic servos, includes hydraulic pressure sensing openings at the suction and pressure sides of at least one stator vane of the torque converter These pressure sensing openings supply respective hydraulic pressures on the suction and pressure sides. The sensed hydraulic pressures are applied to a control valve which, in turn, modulates the action of a pressure regulating valve regulating the hydraulic line pressure applied to the servos of the speed change gear unit.

An object of the invention is to provide an improved hydraulic control system for an automatic transmission including a torque converter and a speed change gear unit with hydraulic servos.

Another object of the invention is to provide such a hydraulic control system in which the line pressure applied to the servos is regulated in accordance with the difference between the hydraulic pressures sensed at the suction and pressure sides of a stator vane of the torque converter.

A further object of the invention is to provide such a hydraulic control system in which the sensed hydraulic pressures are used to modulate the action of a pressure regulating valve in controlling the line pressure applied to the servos.

Another object of the invention is to provide such a hydraulic control system in which the sensed pressures are applied to a control valve which, in turn, modulates the action of the pressure regulating valve in controlling the line pressure.

For an understanding of the principles of the invention, reference is made to the following description of typical embodiments thereof as illustrated in the accompanying drawings.

DESCRIPTION OF THE PREFERRED EMBODIMENTS

Figure 1:
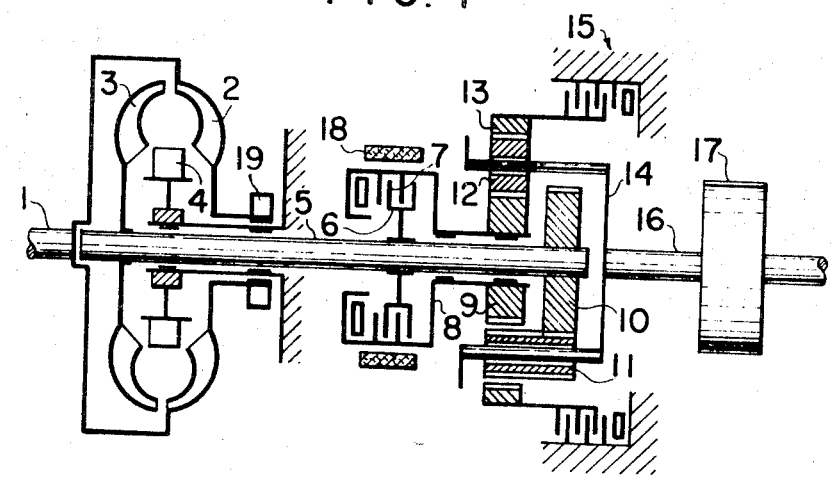
FIG. 1 is a schematic illustration of one example of automatic transmission to which a hydraulic control system embodying the present invention is applicable.

Referring to the drawings, FIG. 1 illustrates an automatic transmission to which the control system of the present invention may be applied. This automatic transmission includes a torque converter, comprising a pump, a turbine and a stator, and a speed change gear unit controlled by brake bands, clutches, and the like. The automatic transmission schematically illustrated in FIG. 1 provides two forward speeds and one reverse speed.

Referring to FIG. 1, the torque converter includes a pump impeller 2, directly connected to a driving engine crankshaft 1, a turbine runner 3 and at least one stator wheel 4. The engine power is transmitted from pump impeller 2 to turbine runner 3 through the medium of a hydraulic fluid such as oil, and the hydraulic fluid or oil is returned by stator 4 to reenter impeller 2. By virtue of the flow action of the hydraulic fluid, the torque is continuously transmitted to a turbine shaft 5 from which it is transmitted to the speed change gear unit mounted behind the torque converter.

Turbine runner 3 is connected to turbine shaft 5 which forms an input shaft for a planetary gear system. A hub 6 of a clutch 7, and an input sun gear 10, are secured on turbine shaft 5. A low speed sun gear 9 forms a body with a clutch drum including a disc 8 which may be driven by hub 6 through the medium of a number of clutch plates. Pinions 11, which mesh with sun gears 10 and pinions 12, which mesh with sun gear 9, are rotatably mounted on a carrier 14 which is integral with an output shaft 16. The pinions 12 also mesh with an internal ring gear 13. A front brake band 18 is cooperable with the outer periphery of the clutch drum, and a rear brake 15 is operable between the outer periphery of a drum fixed to ring gear 13 and the casing of the transmission. A governor 17 is provided on output shaft 16, and an oil pump 19 is driven directly by the driving engine.

The operation of the transmission will now be described. First or low speed gear is obtained by applying front brake band 18 to hold clutch drum 8 and low sun gear 9 stationary so that rotation of turbine shaft 5 is transmitted, at a speed reduction, to output shaft 16.

The second or higher forward speed gear is obtained by engaging clutch 7 to couple the planetary gear components as a body so that turbine shaft 5 is directly coupled with output shaft 16 which now operates at the higher second speed.

The reverse speed gear is obtained by applying rear brake 15 to hold ring gear 13 stationary so that turbine shaft 5, through the planetary gearing, drives output shaft 16 in the reverse direction at a lower speed.

As will be clear, the two forward speed gear and the reverse speed gear are established by transmitting the torque of turbine shaft 5 to the speed change gear with appropriate control of clutch 7 and of brakes 15 and 18 by the application of the necessary hydraulic line pressure to servos. The present invention is directed to the hydraulic control system for the servo pressure to be applied to clutch 7 and to brakes 15 and 18. This will be explained in detail with reference to FIG. 2.

Figure 2:
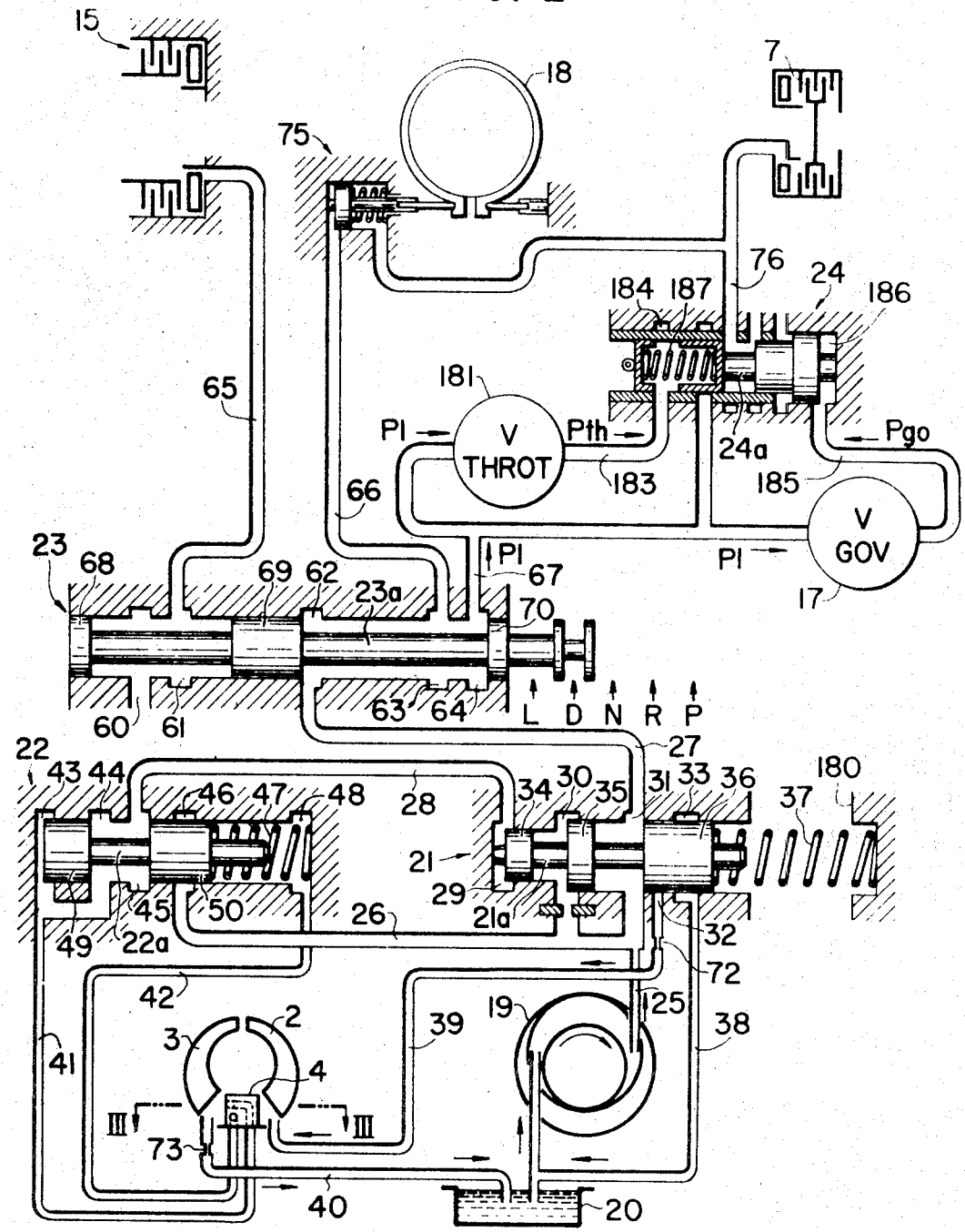
FIG. 2 is a schematic diagram of a hydraulic control circuit applicable to the automatic transmission shown in FIG. 1.

Referring to FIG. 2, a manual valve 23, for selecting the operation of the automatic transmission, is illustrated as set at the "D" position, which is the "driving range" position. Oil pump 19 driven directly by engine shaft 1 pumps oil from an oil sump 20 and supplies it to a second chamber 30 and to a third chamber 31 of a pressure regulator valve 21, through the medium of a passage or conduit 25.

Passage 25 also communicates with a passage or conduit 26 communicating with a control valve 22, and passage 25 also communicates with manual valve 23 through the medium of a passage or conduit 27, which may be termed the line pressure conduit or passage.

A first chamber 29 of pressure regulator valve 21 is in communication with a third chamber 45 of control valve 22 through a passage or conduit 28. A chamber 32 of pressure regulator valve 21 is connected to circulating passages 39 and 40 of the torque converter, and a chamber 33 of pressure regulator valve 21 is connected to an exhaust passage, conduit, or line 38 communicating with the intake or suction side of pump 19 and with sump 20. A valve element 21a of pressure regulator valve 21 is formed with lands 34, 35 and 36 which are so arranged as to permit chambers 29, 30, 31 and 33 either to communicate with each other or to be blocked off from one another. A coil compression spring 37 is provided at the right end of valve element 21a, and is interposed between the casing wall 180 and land 36 to apply a biasing force tending to move valve element 21a to the left.

Figure 3:
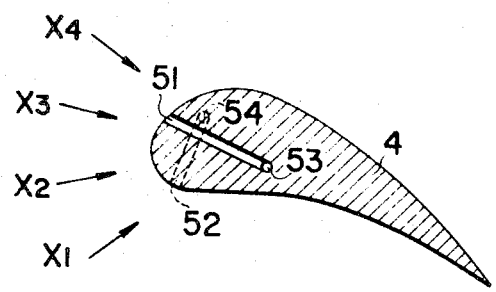
FIG. 3 is a cross-sectional view of a stator vane provided with pressure sensing openings, taken along the line III-III of FIG. 2.

A line, conduit, or passage 41, communicating with a first chamber 43 and a second chamber 44 of control valve 22, is connected to a passage 53 communicating with a pressure sensing opening 51 at the suction side of the stator vane 4 of the torque converter, this vane being shown in FIG. 3. Furthermore, a passage 42, communicating with a fifth chamber 48 of control valve 22, is connected to a passage 54 communicating with a sensing opening 52 at the pressure side of the stator vane 4 shown in FIG. 3. A fourth chamber 46 of control valve 22 communicates with delivery or output passage 25 of pump 19 through the line 26.

A valve element 22a of control valve 22 is formed with lands 49 and 50 which are so arranged as either to permit chamber 43, 44, 45, 46 and 48 to communicate with each other or to block such communication between these chambers. A coil compression spring 47 in chamber 48 of control valve 22 applies a bias urging valve element 22a to move to the left.

The line pressure LP in passage 27, regulated by pressure regulator valve 21, is selectively applied to clutch 7 and brakes 15 and 18 by changing the positions of manual valve 23, for example, from the "D" position (drive range) to the "L" (low range) etc. Manual valve 23 includes, beginning at the left end, an exhaust port 60, a chamber 61 communicating with brake 15 through a line 65, a chamber 62 communicating with pump delivery passage 25 through a line 27, a chamber 63 communicating with a servo 75 for actuating brake band 18, through a passage for line 66, and a chamber 64, communicating with a shift valve 24 through a line 67. A valve element 23a of manual valve 23 is formed with lands 68, 69 and 70 which are arranged either to permit chambers 60, 61, 62, 63 and 64 to communicate with each other or to be blocked from one another, in accordance with the manual control applied to valve element 23a. In the "D" position shown in FIG. 2, passage 27 communicates with passage 66 and 67, and line pressure LP in passage 27 is thus supplied to lines 66 and 67.

A shift valve 24 has the function of automatically shifting the gear of the transmission by either connecting passage 67 to passage 76 or blocking communication between passages 67 and 76, in accordance with the running condition of the vehicle. The signal pressure for changing over shift valve 24 in accordance with the running condition is a throttle pressure Pth produced by a throttle valve 181, and a governor pressure Pgo, produced by a governor valve 17. Throttle valve 181 converts the line pressure LP in line 67 into a throttle pressure Pth corresponding to an engine throttle valve opening, to supply the throttle pressure Pth to a first chamber 184, of shift valve 24, through a line 183. Governor valve 17 converts the line pressure LP in line 67 into a governor pressure Pgo corresponding to the r.p.m. of output shaft 16, and supplies this governor pressure Pgo to a second chamber 186, of shift valve 24, through passage 185.

A coil compression spring 187 at the left end of a valve element 24a of shift valve 24 applies a bias urging valve element 24a to the right. Valve element 24a has applied thereto the throttle pressure Pth from first chamber 184 and the bias of spring 187, and also has applied thereto the governor pressure Pgo from a second chamber 186, these tow pressures acting in opposition. Thus, valve element 24a will be moved either to the right or to the left in dependence upon the ratio of the forces acting to the right to the forces acting to the left. When the force acting to the right is stronger than the force acting to the left, valve element 24a will move to the right, as illustrated, to block communication between lines 67 and line 76, so that brake band 18 is engaged and clutch 7 is released, thus holding the gearing in the first or low speed position.

When the governor pressure Pgo increases with an increase in the vehicle speed, the left-acting force on valve element 24a overbalances the right-acting force to move valve element 24a to the left. Communication is then established between lines 67 and line 76, resulting in a release of brake band 18 and an engagement of clutch 7 to change the gearing to the second or higher forward speed. As throttle valve 181 and governor valve 17 are well known to those skilled in the art, suitable valves may be selected in accordance with the desired design conditions.

Figure 4:
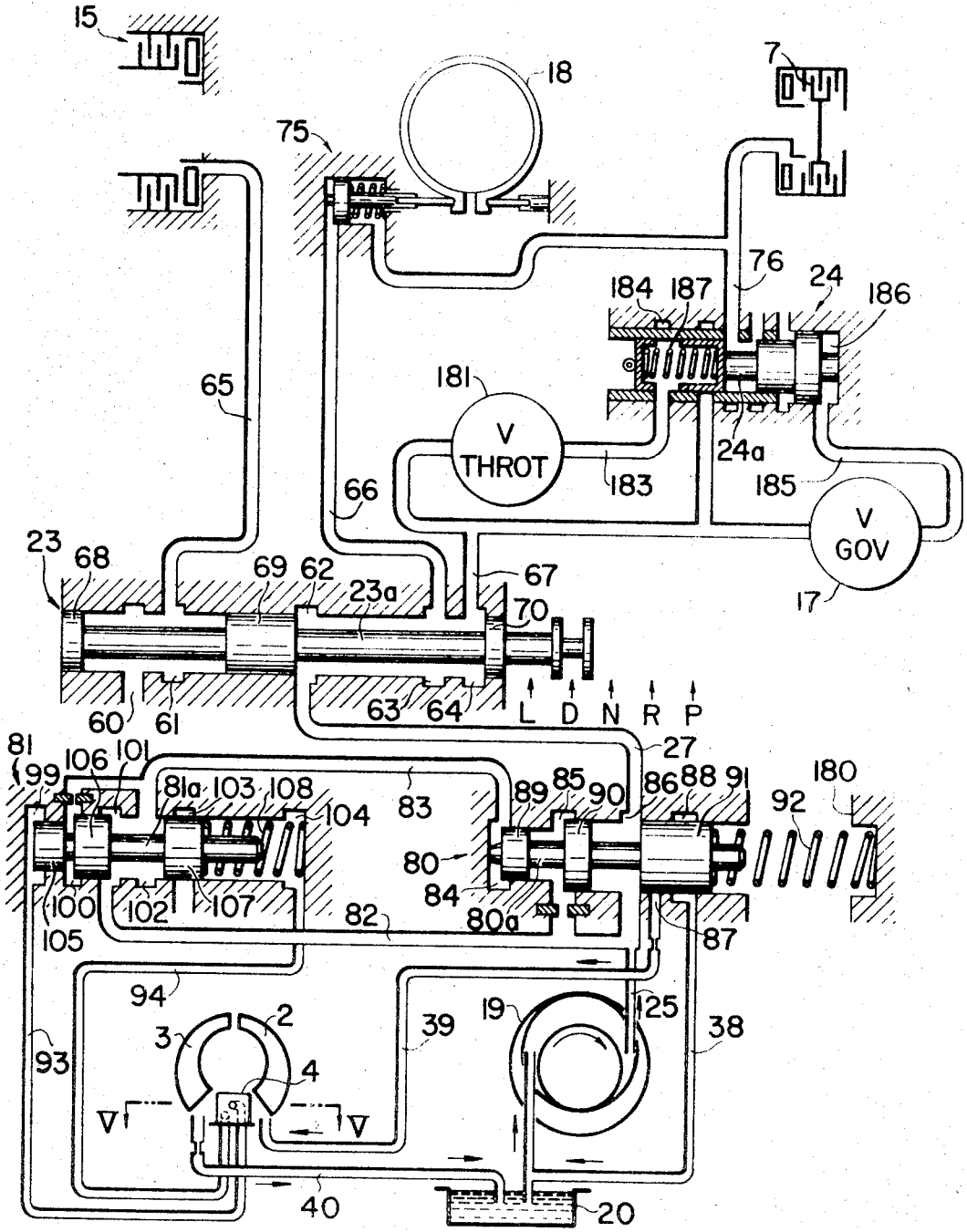
FIG. 4 is a schematic illustration of another hydraulic control circuit embodying the present invention.

Referring now to the embodiment of the hydraulic control system shown in FIG. 4, the upper portion of FIG. 4, above manual valve 23 is identical to that in FIG. 2 so that the same reference characters have been used and a description thereof will be omitted. Also, delivery line 25 and suction line 38 of oil pump 19, and circulation passages 39 and 40 of the torque converter, are the same as in FIG. 2, so that again the same reference characters have been used.

In the arrangement shown in FIG. 4, oil pump delivery line 25 is connected to a second chamber 85 and a third chamber 86 of a pressure regulator valve 80, and is also connected to a line 82, communicating with a control valve 81, and a line 27, communicating with manual valve 23. A first chamber 84 of pressure regulator valve 80 communicates with a second chamber 100 and a fourth chamber 102, of a control valve 81, through a line 83. A chamber 87 of pressure regulator valve 80 communicates with circulation passages 39 and 40, and a chamber 88 communicates with a passage or line 38 communicating with the suction side of oil pump 19 and with oil sump 20. A valve element 80a of pressure regulator valve 80 is formed with lands 89, 90 and 91, which are so arranged as either to permit communication between chambers 84, 85, 86, 87 and 88 or to block communication between these chambers. A coil compression spring 92 is arranged at the right end of pressure regulator valve 80 and is interposed between the casing wall 180 and land 91 of valve element 80a to provide a spring bias tending to move valve element 80a to the left.

Figure 5:
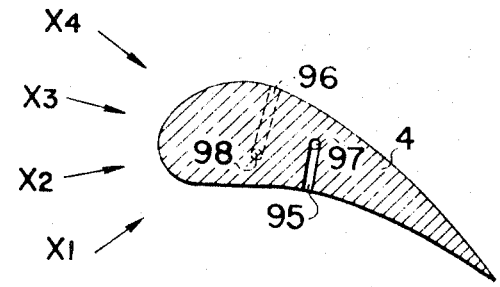
FIG. 5 is a cross-sectional view of the stator vane provided with pressure sensing openings, taken along the line V-V of FIG. 4.

A passage 93, connected to control valve 81, is connected to a passage 97 communicating with a pressure sensing opening 95 at the pressure side of a torque converter stator blade 4, as shown in FIG. 5, and also communicates with the first chamber 99 of control valve 81. A passage 94 connected to control valve 81 is connected to a passage 98 communicating to a pressure sensing opening 96 at the suction side of the torque converter stator blade 4 shown in FIG. 5, and communicates with a sixth chamber 104 of control valve 81. A third chamber 101 of control valve 81 communicates with delivery line 25 of pump 19 through a line 82, and a fifth chamber 103 communicates with an exhaust passage. Valve element 81a of control valve 81 is formed with lands 105, 106 and 107, which are so arranged as either to permit communication between chambers 99, 100, 101, 102, 103 and 104, or to block such communication. A coil spring 108 is provided at the right end of control valve 81 to provide a left-acting spring bias against valve element 81a.

Reverting to the hydraulic control circuit shown in FIG. 2, the operation of the invention hydraulic control means will now be described. Upon starting of the engine to drive oil pump 19, oil is pumped from oil sump 20 and is supplied to second chamber 30 and third chamber 31, of pressure regulator valve 21, through delivery line 25. The oil is also supplied to fourth chamber 46 of control valve 22 through line 26, and further, from third chamber 31 of pressure regulator valve 21 to third chamber 62 of manual valve 23, through line 27. In the "D" position of manual valve 23, the oil will be applied to front brake band 18, shift valve 24, throttle valve 181 and governor valve 17.

When the pump discharge increases with an increase in speed of the vehicle, as the terminal ends of passages 26 and 27 are blocked, the pressures in chambers 30 and 31 of pressure regulator valve 21 will increase. By virtue of the pressure increase in chamber 30, the rightward acting hydraulic pressure applied to land 35 of valve 21 is increased, and at length overcomes the bias of coil spring 37, to move valve element 21a to the right. After a certain displacement to the right of valve element 21a, chamber 32, communicating with torque converter circulation passages 39 and 40, will be uncovered so that pressure oil is supplied to passages 39 and 40.

Due to the passage resistances 72 and 73 in circulation passages 39 and 40, the pressure in chamber 30 gradually increases with an increase in the pump speed, and vale element 21a will move further to the right until it stops at the position where chamber 31 is in communication with exhaust chamber 33. At this time, a hydraulic pressure, set by the balance between the spring bias and the hydraulic pressure on regulator valve 21, is established in chamber 31 for application to brakes 15, 18 or clutch 7 as a servo pressure in line 27.

The hydraulic pressure in first chamber 29 of pressure regulator valve 21 also depends upon the mentioned balance relative to the spring bias. With the increase of hydraulic pressure in chamber 29, the pressures in chambers 30 and 31 gradually decrease and, on the contrary, with a decrease in the pressure in chamber 29, the pressures in chambers 30 and 31 will increase. The pressure supplied to chamber 29 of regulator valve 21 is a hydraulic pressure regulated by control valve 22.

The explanation for this is that a hydraulic pressure, acting on the pressure sensing opening 51 at the suction side of torque converter stator vane 4 of FIG. 3, is applied to chambers 43 and 44 of control valve 22, and a hydraulic pressure acting on the pressure sensing opening 52 at the pressure side of torque converter stator vane 4 of FIG. 3 is applied to chamber 48. When the resultant of the pressure in chamber 48 and the bias of spring 47 is greater than the pressure in chamber 43, acting on valve element 22a of control valve 22, element 22a is located in the left position illustrated in FIG. 2. Thus, the pressure in chamber 43 will act in chamber 29 of pressure regulator valve 21, being exerted through chambers 44 and 45 and line 28. Such a condition is established in the case when the flow direction of oil, flowing into stator vane 4, trends almost equal to the direction of the oil passages 54, that is, in the case where the speed ratio of the torque converter, which is the ratio of the turbine r.p.m. to the pump r.p.m., is comparatively small, as a result of which the hydraulic pressure will be applied to land 34 of pressure regulator valve 21.

On the other hand, with an increase in the above-mentioned speed ratio, the flow direction of oil, flowing into stator vane 4, gradually changes from the $X_1$ direction to the $X_2$ direction, the $X_3$ ..., as shown in FIG. 3, so that the pressure acting on pressure sensing opening 51 at the suction side of vane 4 will increase and the pressure acting on the pressure sensing opening 52 at the pressure side of vane 4 will decrease. Thus, the pressure acting on land 34 of regulator valve 21 also gradually increases and eventually the pressure applied to land 49 of control valve 22 overcomes the resultant of the spring bias and the hydraulic pressure applied to land 50, to move valve element 22a to the right and to hold it in the right position. Under these conditions, chamber 44 of control valve 22 is blocked by land 49 and, instead, chamber 46 is connected to chamber 45. Accordingly, chamber 30 of regulator valve 21 is in communication with chamber 29 through lines 26 and 28, and the pressure in chamber 30 or in chamber 29 will drop to a constant value. At this time, the servo pressure, even though the speed ratio of the torque converter may still increase, will be maintained at this constant value so long as the speed ratio conditions exist.

As described above, in accordance with the present invention, it is intended that the servo hydraulic pressure be gradually decreased in accordance with an increase of the speed ratio of the torque converter until a certain speed ratio is attained. The servo hydraulic pressure is maintained at a constant low pressure when the certain speed ratio is attained, by applying a hydraulic pressure, corresponding to the speed ratio, to pressure regulator valve 21 as a regulating pressure, so that a change in pressure which is desirable as the servo pressure for the automatic transmission can be obtained. More particularly, when the speed ratio is small, as when a large traction torque is required for the vehicle, a high servo pressure is necessary in order to assure perfect functioning of the clutches and brakes while, as the traction torque demand becomes small in accordance with an increase of the speed ratio, the servo pressure will be sufficient at a lower value. Additionally, if the servo pressure were high in the large speed ratio, a substantial shock would occur during automatic gear change, and the power loss in the oil pump would increase, so that it is desirable to maintain the servo pressure at a constant and low pressure in such case.

Referring again to FIG. 4, pressure regulator valve 80 is identical in construction with pressure regulator valve 21 of FIG. 2. Namely, pressure regulator valve 80 also includes a chamber 84 and, with an increase of pressure in chamber 84, the pressures in chambers 85 an 86 will decrease and, with a decrease in pressure chamber 84, the pressure in chambers 85 and 86 will increase.

The hydraulic pressure acting on pressure sensing opening 95 at the pressure side of the torque converter stator vane 4 shown in FIG. 5 is applied to chamber 99 of control valve 81, and the hydraulic pressure acting on the pressure sensing opening 96 at the suction side of stator vane 4 of FIG. 5 is applied to chamber 104 of valve 81. When the effective pressure in chamber 99 is larger than the resultant of the hydraulic pressure in chamber 104 and the bias of spring 108, valve element 81a of control valve 81 moves to the right so that land 106 blocks off chamber 101 and chambers 100 and 102 communicate with exhaust chamber 103 to exhaust the hydraulic pressure in chamber 84 of valve 80 through line 83.

In case stator vane 4 has a large upper force applied thereto by pressure oil flowing thereinto, or in case the speed ratio of the torque converter is small, as in the case where the oil flow is in $X_1$ direction, the pressure in chamber 84 of pressure regulator valve 80 is exhausted, so that the pressures in chambers 85 and 86 will be maintained at a certain high value. On the other hand, as the oil flow direction gradually changes from $X_2$ to $X_3$, as viewed in FIG. 4 and in accordance with an increase of the speed ratio of the torque converter, the pressure acting on pressure sensing opening 95 at the pressure side of stator vane 4 will decrease, while the pressure acting on pressure sensing opening 96 at the suction side will increase. As a result, valve 81a is urged to the left to block exhaust chamber 103 by land 107 and to unblock chamber 101 to establish communication between chambers 100 and 102. Thereby there is established, in chambers 100 and 102, a hydraulic pressure proportional to the pressure in chamber 104 and inversely proportional to the pressure in chamber 99 as long as valve element 81a is maintained in a balanced condition, and this pressure is applied to chamber 84 of pressure regulator valve 80. As a result, the hydraulic pressure acting on land 89 of regulator valve 80 gradually increases with the increase of the speed ratio of the torque converter, and thus the line pressure in chambers 85 and 86 is gradually decreased. When the hydraulic pressure in chamber 104 increases further with an increase of the speed ratio of the torque converter, valve element 81a, being urged to the limiting position in which it engages the wall at the left end of control 81, will eventually lose its pressure balancing function. As a result, and in the same manner as in the example of FIG. 2, chamber 85 of regulator valve 80 is in complete communication with chamber 84 through lines 82 and 83, and the hydraulic pressure in chamber 85 or chamber 84 will drop to a constant value. Similarly to the example already described, even through the speed ratio of the torque converter may still increase, the servo pressure will be maintained at this constant value as long as the condition exists.

While the embodiment of the invention shown in FIG. 4 differs in the operation of the control valve with respect to the embodiment of the invention shown in FIG. 2, the servo pressure, obtained in the same manner as in the case of FIG. 2, can be changed favorably in accordance with the speed ratio to he torque converter.

Thus, in accordance with the present invention, as applied to an automatic transmission having a torque converter, the hydraulic pressure for actuating the servo units of the automatic transmission may be changed in accordance with changes of the hydraulic pressure acting on the stator vane of the torque converter, so that the following effects are attainable;

1. the driving power for the oil pump can be reduced;
2. noise, cavitation, etc. of the oil pump during high-speed operation can be reduced.
3. the shock occuring during automatic gear shifting can be reduced to a minimum.

All of these effects are very valuable, from he practical standpoint, in the operation of an automatic transmission.

While the two examples of preferred embodiments of the hydraulic control system of the present invention have been described as applied to automatic transmissions having two forward speeds and one reverse speed, it will be understood that the system is not limited to transmissions of this type. Thus, it may be applied to transmission having more than two forward speeds or more than one reverse speed.

While specific embodiments of the invention have been shown and described in detail to illustrate the application of the principles of the invention, it will be understood that the invention may be embodied otherwise without departing from such principles.

What We claim is:

1. A hydraulic control system, for an automatic transmission of the type including an engine-driven torque converter having at least one stator vane, speed change gears connecting the torque converter to an output shaft, and hydraulic servos controlling components of the speed change gears, said hydraulic control system comprising, in combination, respective hydraulic pressure sensing openings in the suction and pressure sides of at least one stator vane of said torque converter for supplying the respective hydraulic pressures on said suction and pressure sides; a pressure regulator valve connected between a source of hydraulic fluid, under a pressure variable with engine speed, and said servos, and regulating a line pressure applied to said servos; and means controlling said pressure regulator valve in accordance with said respective hydraulic pressures on said suction and pressure sides of said stator vane to regulate the line pressure applied to said servos in accordance with variations in said respective hydraulic pressures on said suction and pressure sides of said stator vane.

A hydraulic control system for an automatic transmission, as claimed in claim 1, in which said means comprises a control valve modulating the control pressure effective on said pressure regulating valve and including a movable valve element having said respective hydraulic pressures on said suction and pressure sides applied to respective opposite ends thereof.

3. A hydraulic control system for an automatic transmission, as claimed in claim 2, including spring means engaging one end of said movable member and supplementing the hydraulic pressure applied to such one end.

4. A hydraulic control system for an automatic transmission, as claimed in claim 3, in which said spring means is engaged with that end of said movable member having the hydraulic pressure on the pressure side of said stator vane A thereto.

5. A hydraulic control system for an automatic transmission, as claimed in claim 3, in which said spring means engages that end of said movable member having the hydraulic pressure on the suction side of said stator vane applied thereto.

6. A hydraulic control system for an automatic transmission, as claimed in claim 2, in which said control valve controls said pressure regulating valve to vary said line pressure inversely as a function of the ratio of the output speed of said torque converter to the input speed of said torque converter.

7. A hydraulic control system for an automatic transmission, as claimed in claim 6, including means limiting movement of said movable member in a line pressure increasing control direction to maintain said line pressure substantially constant when said speed ratio exceeds a predetermined value.